United States Patent
Takeuchi et al.

(10) Patent No.: US 11,760,435 B2
(45) Date of Patent: Sep. 19, 2023

(54) SADDLE RIDING VEHICLE

(71) Applicant: HONDA MOTOR CO., LTD., Tokyo (JP)

(72) Inventors: Yoshiaki Takeuchi, Tokyo (JP); Tomohiko Yashiro, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 428 days.

(21) Appl. No.: 17/208,010

(22) Filed: Mar. 22, 2021

(65) Prior Publication Data

US 2021/0300498 A1    Sep. 30, 2021

(30) Foreign Application Priority Data

Mar. 30, 2020 (JP) ................. 2020-061299

(51) Int. Cl.
| | | |
|---|---|---|
| *B62J 45/41* | (2020.01) | |
| *B62J 45/413* | (2020.01) | |
| *B62J 43/13* | (2020.01) | |
| *B62J 1/02* | (2006.01) | |

(52) U.S. Cl.
CPC ............ *B62J 45/413* (2020.02); *B62J 1/02* (2013.01); *B62J 43/13* (2020.02)

(58) Field of Classification Search
CPC ... B62J 45/413; B62J 1/02; B62J 43/13; B62J 99/00; F02N 2200/022; F02N 2200/044; F02N 11/101; B62M 7/00; B62M 7/02; B62M 25/00; B62M 25/08
See application file for complete search history.

(56) References Cited

U.S. PATENT DOCUMENTS

2011/0271928 A1* 11/2011 Siciak .................. F02D 23/02
123/198 DB

FOREIGN PATENT DOCUMENTS

| JP | 2007-032494 | 2/2007 |
|---|---|---|
| JP | 5566499 | 8/2014 |
| JP | 2016-061254 | 4/2016 |
| JP | 2018-087529 | 6/2018 |
| JP | 2018-123723 | 8/2018 |

OTHER PUBLICATIONS

Japanese Notice of Allowance for Japanese Patent Application No. 2020-061299 dated Nov. 2, 2021.

* cited by examiner

*Primary Examiner* — Xiao En Mo
(74) *Attorney, Agent, or Firm* — AMIN, TUROCY & WATSON, LLP

(57) ABSTRACT

A saddle riding vehicle includes an internal combustion engine having a crankshaft, a starter motor having a rotary shaft connected to the crankshaft, a main shaft connected to the crankshaft, a countershaft connected to the main shaft and configured to transmit power to a driving wheel, a battery configured to supply electric power to the starter motor, a rotation detector configured to detect a rotation state of the crankshaft, an acquisition part configured to acquire a rotational speed on the basis of the rotation state detected by the rotation detector, and a controller configured to stop the starter motor in a case the rotational speed is equal to or smaller than first threshold in a state in which the rotary shaft, the crankshaft, the main shaft and the countershaft are connected.

10 Claims, 4 Drawing Sheets

SADDLE RIDING VEHICLE

CROSS-REFERENCE TO RELATED APPLICATION

Priority is claimed on Japanese Patent Application No. 2020-061299, filed Mar. 30, 2020, the content of which is incorporated herein by reference.

BACKGROUND OF THE INVENTION

Field of the Invention

The present invention relates to a saddle riding vehicle.

Description of Related Art

In the related art, for example, a device configured to stop a starter, which is configured to start an internal combustion engine, in order to prevent an excessive current from flowing to the starter due to a locked state of a driving wheel or the like in a connected state between the internal combustion engine and the starter is known (for example, see Japanese Unexamined Patent Application, First Publication No. 2016-61254).

SUMMARY OF THE INVENTION

Incidentally, in such a saddle riding vehicle, by stopping the starter when an integrated value of a crank pulse signal or a cam pulse signal in a tire-locked state is equal to or smaller than a threshold, an unnecessary operation of a starter is suppressed as much as possible while allowing an emergency escape mode that continues the operation of the starter. However, in the process of stopping the starter when the integrated value of the crank pulse signal or the cam pulse signal is less than the threshold, regardless of the size of the load of the starter, for example, even when the load of the starter is small, the starter may be stopped excessively.

An aspect of the present invention is directed to providing a saddle riding vehicle capable of appropriately stopping a starter motor.

The following aspects of the present invention are employed.

(1) A saddle riding vehicle (10) according to an aspect of the present invention includes an internal combustion engine (11) having a crankshaft (21); a starter motor (13) having a rotary shaft (13a) connected to the crankshaft; a main shaft (23) connected to the crankshaft; a countershaft (25) connected to the main shaft and configured to transmit power to a driving wheel (27); a battery (15) configured to supply electric power to the starter motor; a rotation detector (19) configured to detect a rotation state of the crankshaft; an acquisition part (17) configured to acquire a rotational speed on the basis of the rotation state detected by the rotation detector; and a controller (17) configured to stop the starter motor in a case the rotational speed is equal to or smaller than a first threshold in a state in which the rotary shaft, the crankshaft, the main shaft and the countershaft are connected.

(2) In the saddle riding vehicle according to the above-mentioned (1), the controller may stop the starter motor in a case the rotational speed is included in a first zone that is equal to or smaller than the first threshold and that is greater than a second threshold, which is smaller than the first threshold, and in a case a predetermined condition is satisfied; and stop the starter motor regardless of the predetermined condition in a case the rotational speed is included in a second zone that is equal to or smaller than the second threshold.

(3) In the saddle riding vehicle according to the above-mentioned (2), the predetermined condition may be a case in which an integrated value, which is obtained by integrating a load state quantity according to the rotational speed, is greater than a predetermined load threshold.

(4) In the saddle riding vehicle according to the above-mentioned (3), the controller may set the load state quantity as a state quantity that increases as the rotational speed decreases.

(5) In the saddle riding vehicle according to the above-mentioned (4), the controller may initialize the integrated value to zero in a case a state in which the rotational speed is greater than the first threshold continues for a predetermined time or more.

(6) In the saddle riding vehicle according to any one of the above-mentioned (1) to (5), the controller may acquire a current of the starter motor on the basis of the rotational speed.

According to the aspect of the above-mentioned (1), it is possible to suppress an increase in load of electronic devices such as a battery, a starter motor, and the like, and suppress occurrence of abnormalities by stopping the starter motor in a state in which the rotational speed is low (i.e., a state of a high load).

In the case of the aspect of the above-mentioned (2), since processing content of stopping the starter motor according to a predetermined condition is switched, it is possible to appropriately protect the electronic devices such as the battery, the starter motor, and the like.

In the case of the aspect of the above-mentioned (3), since processing content of stopping the starter motor according to a magnitude of a load is switched, it is possible to appropriately protect the electronic devices such as the battery, the starter motor, and the like.

In the case of the aspect of the above-mentioned (4), it is possible to appropriately protect the electronic devices such as the battery, the starter motor, and the like according to an increase in load by executing processing of stopping the starter motor on the basis of the appropriate load state quantity corresponding to the rotational speed.

In the case of the aspect of the above-mentioned (5), it is possible to suppress an integrated value from being initialized, for example, when the load is decreased temporarily or the like, and appropriately control running and stoppage of the starter motor by appropriately ascertaining a variation in load.

In the case of the aspect of the above-mentioned (6), it is possible to acquire a current of the starter motor and execute appropriate control on the basis of the current of the starter motor without having to provide a current sensor or the like.

DETAILED DESCRIPTION OF THE INVENTION

Hereinafter, a saddle riding vehicle according to an embodiment of the present invention will be described with reference to the accompanying drawings.

Figure 1:
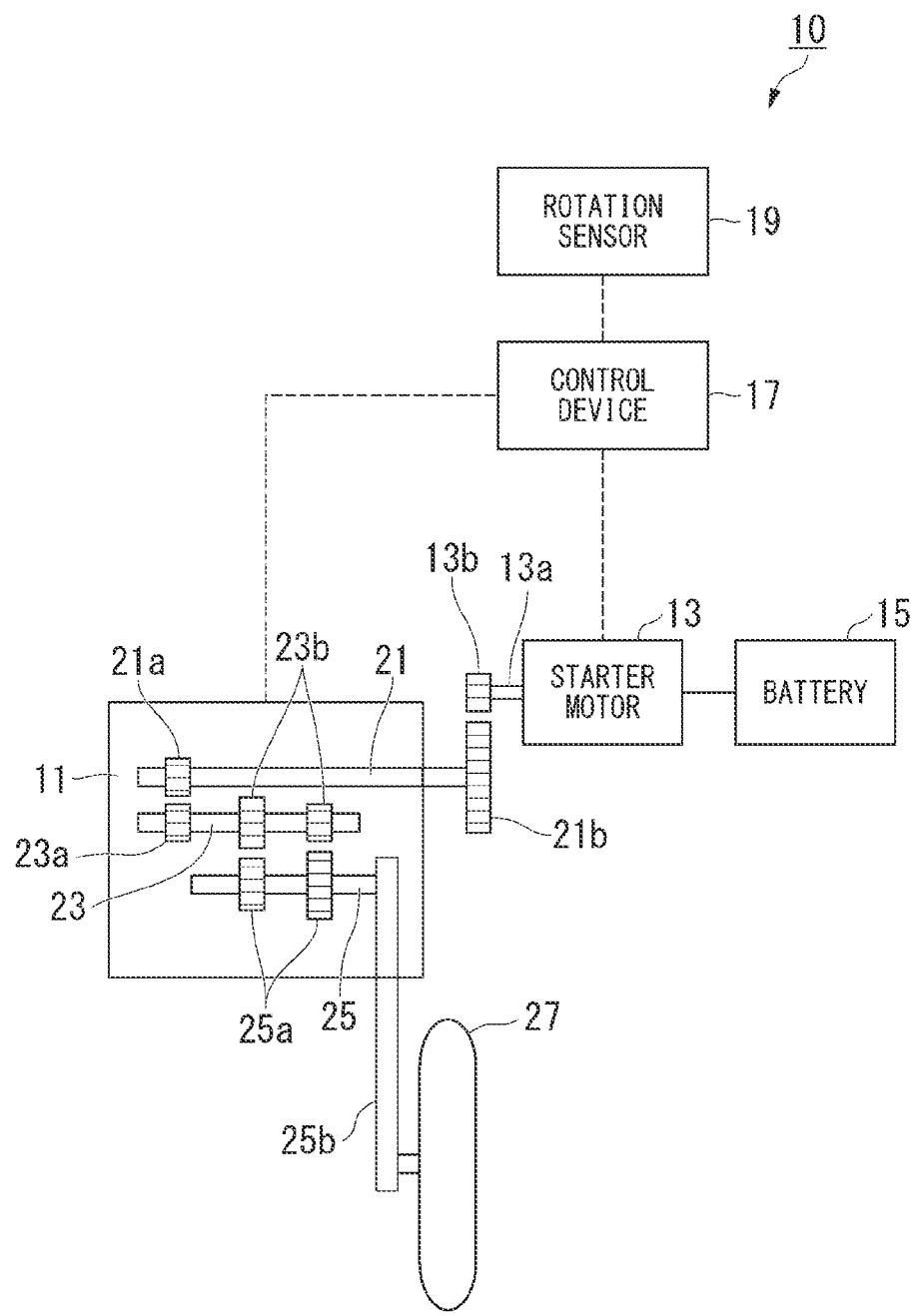
FIG. 1 is a view schematically showing a configuration of a saddle riding vehicle of an embodiment of the present invention.

FIG. 1 is a view schematically showing a configuration of a saddle riding vehicle 10 of the embodiment.

The saddle riding vehicle 10 includes, for example, an internal combustion engine 11, a starter motor 13, a battery 15, a control device 17 and a rotation sensor 19.

The internal combustion engine 11 includes, for example, a crankshaft 21, a main shaft 23 and a countershaft 25.

The crankshaft 21 is connected to, for example, a connecting rod (not shown) of a piston (not shown) of the internal combustion engine 11. The crankshaft 21 is connected to the main shaft 23 via, for example, a clutch (not shown). The crankshaft 21 includes, for example, a gear 21a meshed with a gear 23a of the main shaft 23. The crankshaft 21 is connected to a rotary shaft 13a of the starter motor 13. The crankshaft 21 includes, for example, a power transmission member (not shown) such as a gear 21b meshed with a gear 13b of the rotary shaft 13a of the starter motor 13, or a belt configured to transmit power between the rotary shaft 13a and the crankshaft 21.

The main shaft 23 includes the gear 23a meshed with the gear 21a of the crankshaft 21. The main shaft 23 is connected to the countershaft 25 via, for example, a clutch (not shown). The main shaft 23 includes, for example, a gear 23b meshed with a gear 25a of the countershaft 25.

The countershaft 25 includes the gear 25a meshed with the gear 23b of the main shaft 23. The countershaft 25 is connected to, for example, a driving wheel 27 via a power transmission member 25b such as a chain or the like.

The starter motor 13 includes, for example, the rotary shaft 13a, the gear 13b, and the like, connected to the crankshaft 21. The starter motor 13 is supplied with electric power from the battery 15. The starter motor 13 is driven according to an ON operation of a starter switch (not shown) by a driver upon rotation driving (cranking) of the crankshaft 21, for example, upon starting or the like of the internal combustion engine 11.

The battery 15 is connected to various types of electronic devices (not shown) such as the starter motor 13 and the like, and supplies electric power to each of the electronic devices. The battery 15 is, for example, a lithium ion battery or the like.

The control device 17 is, for example, a software function part that functions by executing a predetermined program using a processor such as a central processing unit (CPU) or the like. The software function part is an electronic control unit (ECU) including a processor such as a CPU or the like, a read only memory (ROM) in which a program is stored, an electronic circuit such as a random access memory (RAM) or the like configured to temporarily store data, and the like.

At least a part of the control device 17 may be an integrated circuit such as large scale integration (LSI) or the like.

The control device 17 controls operations of the saddle riding vehicle 10 in an integrated manner. The control device 17 controls, for example, running and stoppage of the starter motor 13 according to a signal output from the rotation sensor 19.

The rotation sensor 19 is, for example, a crank angle sensor or the like configured to output a crank pulse according to a rotation angle of the crankshaft 21 as a state quantity related to a rotation state of the crankshaft 21.

Hereinafter, an operation of the control device 17 will be described.

Figure 2:
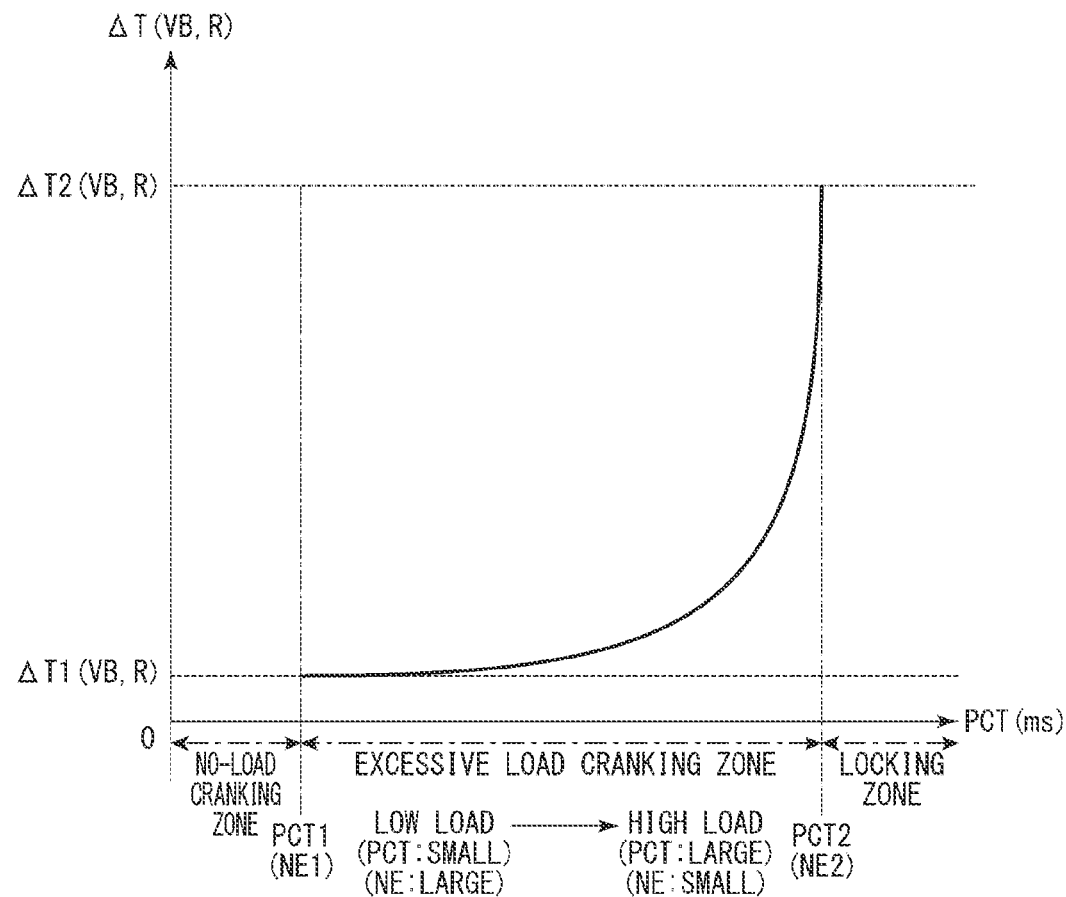
FIG. 2 is a view showing an example of correspondence relationship between a crank pulse interval time (PCT) and a Δ load integrated quantity of the saddle riding vehicle according to the embodiment of the present invention.
Figure 3:
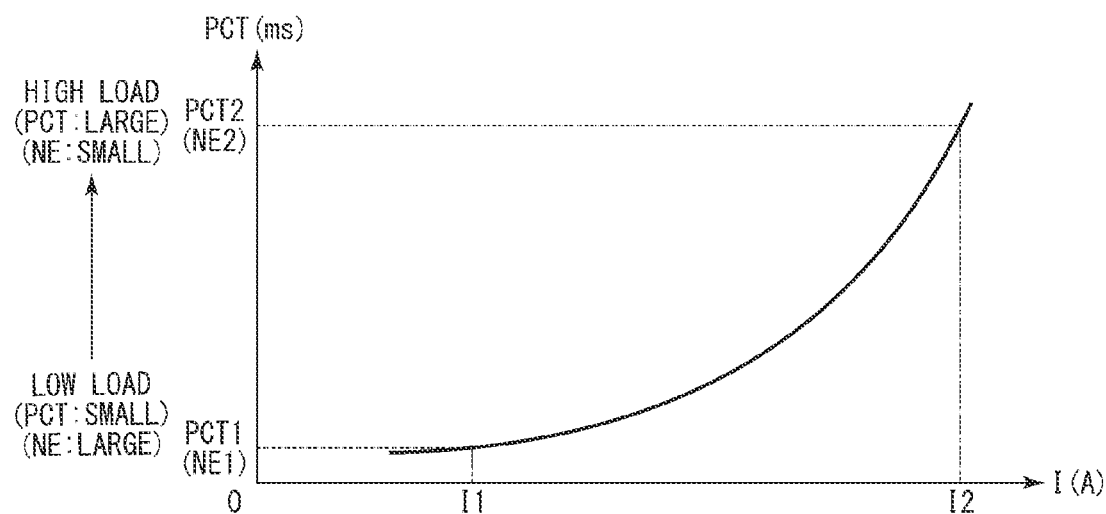
FIG. 3 is a view showing an example of correspondence relationship between a crank pulse interval time (PCT) and a current (I) of a starter motor of the saddle riding vehicle according to the embodiment of the present invention.
Figure 4:
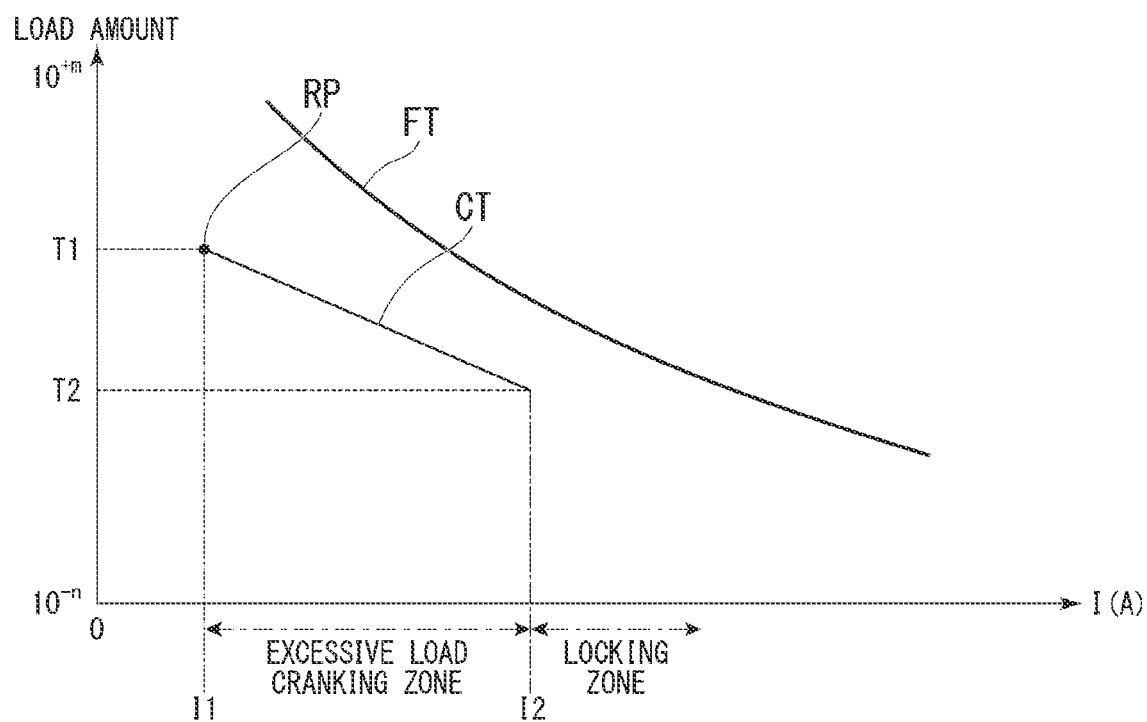
FIG. 4 is a view showing an example of correspondence relationship between a current (I) of the starter motor, a cranking-possible load amount (CT) and an upper limit load amount (FT) of the saddle riding vehicle according to the embodiment of the present invention.

FIG. 2 is a view showing an example of correspondence relationship between a crank pulse interval time (PCT) and a Δ load integrated quantity of the saddle riding vehicle 10. FIG. 3 is a view showing an example of correspondence relationship between a crank pulse interval time (PCT) of the saddle riding vehicle 10 and a current (I) of the starter motor 13. FIG. 4 is a view showing an example of correspondence relationship between a current (I), a cranking-possible load amount (CT) and an upper limit load amount (FT) of the starter motor 13 of the saddle riding vehicle 10.

The control device 17 acquires a rotational speed (NE) on the basis of a state quantity related to a rotation state of the crankshaft 21 output from the rotation sensor 19. For example, the control device 17 acquires a crank pulse interval time (PCT), i.e., an interval time between neighboring pulses corresponding to a time required to rotate the crankshaft 21 by a predetermined angle based on a signal of a crank pulse output from the rotation sensor 19. Since the time required to rotate the crankshaft 21 by the predetermined angle corresponds to an inverse number of an angular speed of the crankshaft 21, the control device 17 acquires a rotational speed (NE) corresponding to a crank pulse interval time (PCT).

The control device 17 controls stoppage of the starter motor 13 on the basis of the rotational speed (NE) in a state in which the rotary shaft 13a of the starter motor 13 and the crankshaft 21 are connected, the crankshaft 21 and the main shaft 23 are connected, and the main shaft 23 and the countershaft 25 are connected.

As shown in FIG. 2, the control device 17 sets a zone in which the rotational speed (NE) is greater than a predetermined first rotational speed NE1 as a no-load cranking zone. The control device 17 sets a zone in which the rotational speed (NE) is equal to or smaller than the predetermined first rotational speed NE1 and is greater than a second rotational speed NE2 that is smaller than the predetermined first rotational speed NE1 as an excessive load cranking zone. The control device 17 sets a zone in which the rotational speed (NE) is equal to or smaller than the predetermined second rotational speed NE2 as a locking zone.

The no-load cranking zone is a zone in which a load of the starter motor 13 is less than a predetermined load and an operation of the starter motor 13 is allowed. The excessive load cranking zone is a zone in which the load of the starter motor 13 is equal to or greater than the predetermined load and an operation of the starter motor 13 is stopped when a predetermined excessive load condition is satisfied. The locking zone is a zone in which an operation of the starter motor 13 is prohibited.

Further, the predetermined first rotational speed NE1 corresponds to a predetermined first crank pulse interval time PCT1, and the predetermined second rotational speed NE2 corresponds to a predetermined second crank pulse interval time PCT2. Since a variation in crank pulse interval time (PCT) corresponds to a variation in an inverse number of the rotational speed (NE), for example, the rotational speed (NE) decreases as the crank pulse interval time (PCT) and the load increase.

In the control device 17, for example, a case in which a predetermined excessive load condition is satisfied is set as a case in which a load integrated quantity of an operation of the starter motor 13 is greater than a predetermined excessive load determination amount. The control device 17 allows an operation of the starter motor 13 when the load integrated quantity of the operation of the starter motor 13 is equal to or smaller than an excessive load determination amount, and meanwhile, stops an operation of the starter motor 13 when the load integrated quantity of the operation of the starter motor 13 is greater than the excessive load determination amount. For example, the control device 17 sets a predetermined excessive load determination amount as a load amount until an operation of the starter motor 13 at a first rotational speed NE1, which is a greatest rotational speed (NE) in an excessive load cranking zone, is stopped, i.e., the cranking-possible load amount (CT). The cranking-possible load amount (CT) is a load amount required until a load integrated quantity corresponding to an integrated value obtained by integrating a load state quantity according to the rotational speed (NE) (for example, a Δ load integrated quantity, which will be described below) reaches an excessive load determination amount corresponding to a predetermined load threshold.

The control device 17 calculates, for example, a load integrated quantity of an operation of the starter motor 13 through integration of a Δ load integrated quantity (ΔT) according to the rotational speed (NE), a power supply voltage (VB), a gear ratio (R), and the like. The power supply voltage (VB) is a voltage supplied from the battery 15 to the starter motor 13. The gear ratio (R) is a ratio between a rotational speed of the crankshaft 21 and an output rotational speed of the countershaft. The control device 17 calculates, for example, a new load integrated quantity by adding a Δ load integrated quantity (ΔT) to the previous value of the load integrated quantity at a predetermined period.

The control device 17 sets, for example, the A load integrated quantity (ΔT) to increase according to a decrease in rotational speed (NE), i.e., an increase in load. For example, in the example shown in FIG. 2, in the appropriate combination of the power supply voltage (VB) and the gear ratio (R), a Δ load integrated quantity (ΔT (VB, R)) is increased from a first Δ load integrated quantity ΔT1 (VB, R) toward a second A load integrated quantity ΔT2 (VB, R) as the rotational speed (NE) is decreased from the first rotational speed NE1 toward the second rotational speed NE2 in the excessive load cranking zone.

For example, in the appropriate combination of the power supply voltage (VB) and the gear ratio (R), the control device 17 sets the Δ load integrated quantity (ΔT) according to the rotational speed (NE) with reference to the first Δ load integrated quantity ΔT1 (VB, R) that is set with respect to the load amount until an operation of the starter motor 13 is stopped at the first rotational speed NE1 which is the greatest rotational speed (NE) in the excessive load cranking zone, i.e., the cranking-possible load amount (CT). Accordingly, for example, by an arbitrary natural number n, when the Δ load integrated quantity (ΔT) becomes n times of the first Δ load integrated quantity ΔT1 (VB, R) according to a decrease in the rotational speed (NE), i.e., an increase in load, the cranking-possible load amount (CT) is multiplied by 1/n.

The control device 17 sets, for example, the cranking-possible load amount (CT) on the basis of the upper limit load amount such as a load amount or the like until abnormality occurs in an electronic device such as the battery 15 or the like according to a load of the starter motor 13. The control device 17 sets, for example, the cranking-possible load amount (CT) using a load amount until fusing occurs in a fuse (not shown) provided in the battery 15 due to a current (I) flowing through the starter motor 13 as an upper limit load amount (FT) so as not to exceed the upper limit load amount (FT).

The control device 17 acquires the current (I) flowing from the crank pulse interval time (PCT) or the rotational speed (NE) to the starter motor 13 based on data or the like indicating correspondence relationship between the crank pulse interval time (PCT) or the rotational speed (NE) and the current (I) flowing to the starter motor 13. As shown in FIG. 3, the current (I) flowing to the starter motor 13 is increased according to a decrease in the rotational speed (NE), i.e., an increase in the crank pulse interval time (PCT) and the load. For example, in the example shown in FIG. 3, as the rotational speed (NE) in the excessive load cranking zone is decreased from the first rotational speed NE1 toward the second rotational speed NE2, the current (I) flowing the starter motor 13 is increased from a first current I1 toward a second current I2.

The control device 17 sets the cranking-possible load amount (CT) so as not to exceed the upper limit load amount (FT) according to the current (I) flowing the starter motor 13 based on the data or the like indicating correspondence relationship between the current (I) flowing the starter motor 13 and the upper limit load amount (FT). As shown in FIG. 4, the upper limit load amount (FT) is decreased as the current (I) flowing to the starter motor 13 is increased. For example, in the example shown in FIG. 4, as a first load amount T1 that is smaller than the upper limit load amount (FT) with respect to the first current I1 corresponding to the first rotational speed NE1, which is the greatest rotational speed (NE) in the excessive load cranking zone, is set as a reference point RP and as the current (I) is increased from the first current I1 toward the second current I2, the cranking-possible load amount (CT) is set to be decreased from the first load amount T1 toward a second load amount T2 that is smaller than the first load amount T1. Further, a load amount axis shown in FIG. 4 is a logarithmic scale by arbitrary natural numbers n and m.

Figure 5:
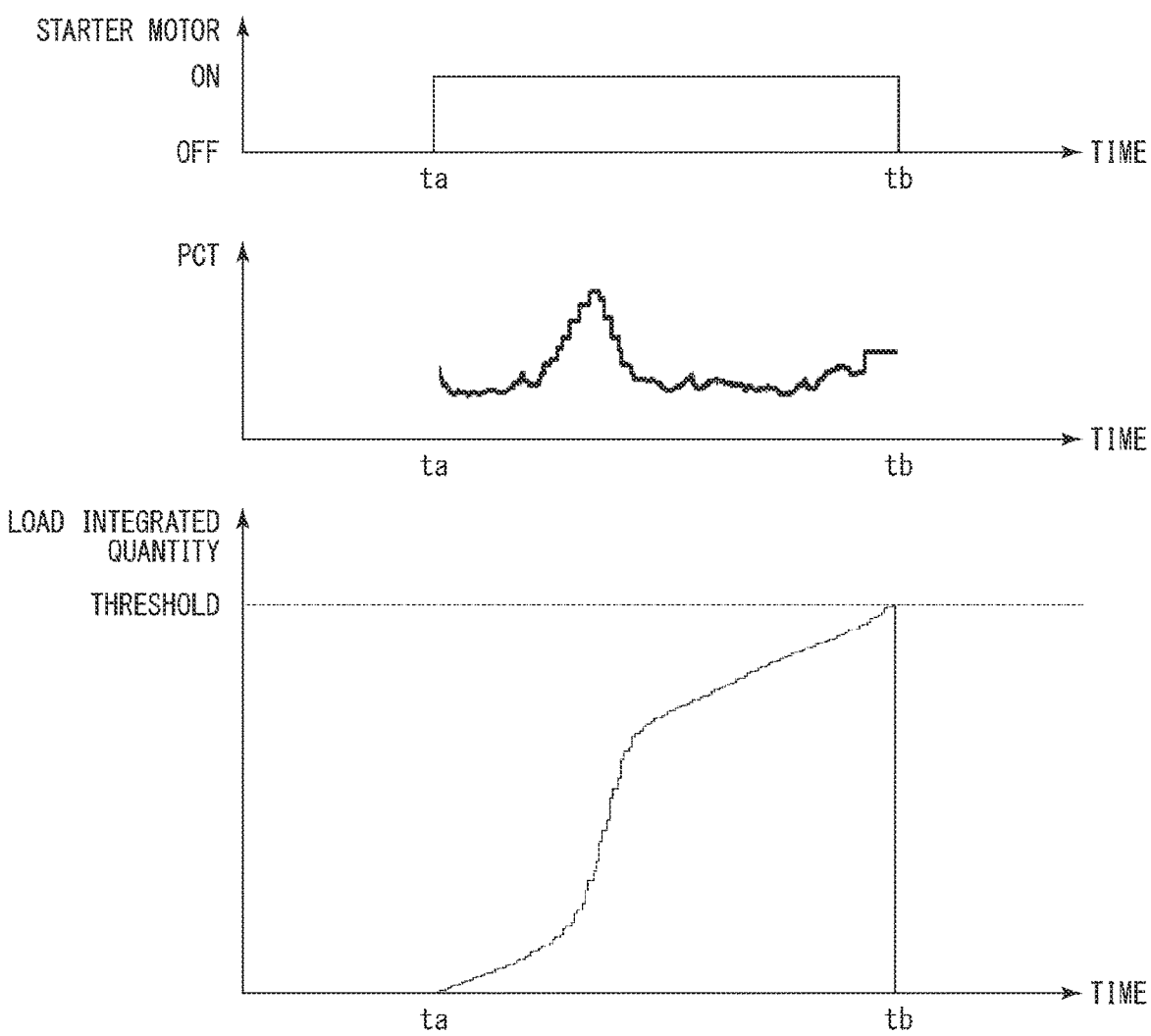
FIG. 5 is a timing chart showing an example of correspondence relationship between an operating condition, a crank pulse interval time (PCT) and a load integrated quantity of the starter motor of the saddle riding vehicle according to the embodiment of the present invention.

FIG. 5 is a timing chart showing an example of correspondence relationship between an operating condition, a crank pulse interval time (PCT) and a load integrated quantity of the starter motor 13. For example, the starter motor 13 is stopped when the A load integrated quantity is accumulated according to a magnitude of the crank pulse interval time (PCT) as in a time to and thereafter and when the load integrated quantity reaches a threshold as in a time tb.

The control device 17 initializes a load integrated quantity to zero, for example, when the rotational speed (NE) is shifted from the excessive load cranking zone to the no-load cranking zone and a state in which the rotational speed (NE) is greater than the predetermined first rotational speed NE1 continues for a predetermined load amount or more.

As described above, in the saddle riding vehicle 10 of the embodiment, an increase in load of the electronic device such as the battery 15, the starter motor 13, and the like, can be suppressed and occurrence of abnormality can be suppressed by stopping the starter motor 13 in a state in which the rotational speed (NE) is low (i.e., a high load state).

The control device 17 can appropriately protect the electronic devices such as the battery 15, the starter motor 13, and the like, while preventing the starter motor 13 from being excessively stopped, by stopping the starter motor 13 on the basis of the load integrated quantity acquired through integration of the A load integrated quantity (ΔT) according to the rotational speed (NE) in the excessive load cranking zone.

For example, due to abnormality (a contact error or the like) of the clutch switch (not shown) configured to output a signal according to ON and OFF of the clutch (not shown), omission of the clutch switch, or the like, even when cranking by the starter motor 13 is executed according to the determination that a disconnected state of the clutch is maintained regardless of the actual state of the clutch, it is possible to suppress excessive current from flowing to the starter motor 13 and suppress occurrence of abnormality in the electronic devices such as the battery 15, the starter motor 13, and the like.

The control device 17 can appropriately protect the electronic device such as the battery 15, the starter motor 13, and the like, according to an increase in load by setting the cranking-possible load amount (CT) in the excessive load cranking zone using the Δ load integrated quantity that is the load state quantity that is increased as the rotational speed (NE) is decreased (i.e., as a load is increased).

The control device 17 can acquire the current flowing to the starter motor 13 on the basis of the rotational speed (NE), and suppress an increase in costs required for the device configuration without having to provide, for example, a current sensor or the like.

The control device 17 initializes the load integrated quantity to zero when a state in which the rotational speed (NE) is shifted from the excessive load cranking zone to the no-load cranking zone continues for a predetermined time or more. Accordingly, for example, it is possible to suppress the load integrated quantity from being initialized when the load is temporarily decreased or the like, and appropriately suppress running and stoppage of the starter motor 13 by appropriately grasping a variation in load. (Variant)

Hereinafter, a variant of the embodiment will be described.

In the above-mentioned embodiment, while the load state quantity according to the rotational speed (NE) is the Δ load integrated quantity, there is no limitation thereto, and for example, another state quantity according to a variation in load such as a voltage, a time, or the like, may be used.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A saddle riding vehicle comprising:
an internal combustion engine having a crankshaft;
a starter motor having a rotary shaft connected to the crankshaft;
a main shaft connected to the crankshaft;
a countershaft connected to the main shaft and configured to transmit power to a driving wheel;
a battery configured to supply electric power to the starter motor;
a rotation detector configured to detect a rotation state of the crankshaft;
an acquisition part configured to acquire a rotational speed on the basis of the rotation state detected by the rotation detector; and
a controller configured to stop the starter motor in a case the rotational speed is equal to or smaller than a first threshold in a state in which the rotary shaft, the crankshaft, the main shaft and the countershaft are connected.

2. The saddle riding vehicle according to claim 1, wherein the controller stops the starter motor in a case the rotational speed is included in a first zone that is equal to or smaller than the first threshold and that is greater than a second threshold, which is smaller than the first threshold, and in a case a predetermined condition is satisfied; and
stops the starter motor regardless of the predetermined condition in a case the rotational speed is included in a second zone that is equal to or smaller than the second threshold.

3. The saddle riding vehicle according to claim 2, wherein the predetermined condition is a case in which an integrated value, which is obtained by integrating a load state quantity according to the rotational speed, is greater than a predetermined load threshold.

4. The saddle riding vehicle according to claim 3, wherein the controller sets the load state quantity as a state quantity that increases as the rotational speed decreases.

5. The saddle riding vehicle according to claim 4, wherein the controller initializes the integrated value to zero in a case a state in which the rotational speed is greater than the first threshold continues for a predetermined time or more.

6. The saddle riding vehicle according to claim 1, wherein the controller acquires a current of the starter motor on the basis of the rotational speed.

7. The saddle riding vehicle according to claim 2, wherein the controller acquires a current of the starter motor on the basis of the rotational speed.

8. The saddle riding vehicle according to claim 3, wherein the controller acquires a current of the starter motor on the basis of the rotational speed.

9. The saddle riding vehicle according to claim 4, wherein the controller acquires a current of the starter motor on the basis of the rotational speed.

10. The saddle riding vehicle according to claim 5, wherein the controller acquires a current of the starter motor on the basis of the rotational speed.

* * * * *